(12) United States Patent
Furui

(10) Patent No.: US 8,670,038 B2
(45) Date of Patent: Mar. 11, 2014

(54) PROJECTION DISPLAY DEVICE AND METHOD OF CONTROLLING THE SAME

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 770 days.

(21) Appl. No.: 12/689,584

(22) Filed: Jan. 19, 2010

(65) Prior Publication Data

US 2010/0182457 A1 Jul. 22, 2010

(30) Foreign Application Priority Data

Jan. 20, 2009 (JP) ................................. 2009-009721

(51) Int. Cl.
*H04N 17/00* (2006.01)
*H04N 17/02* (2006.01)

(52) U.S. Cl.
USPC ...... 348/189; 348/207.99; 348/135; 348/136; 348/180

(58) Field of Classification Search
USPC .......... 348/231.7, 135, 136, 180, 189, 207.99
See application file for complete search history.

(56) References Cited

U.S. PATENT DOCUMENTS

| | | | |
|---|---|---|---|
| 6,297,800 B2 * | 10/2001 | Dagman | 345/601 |
| 6,558,006 B2 * | 5/2003 | Ioka | 353/94 |
| 6,592,228 B1 * | 7/2003 | Kawashima et al. | 353/101 |
| 6,753,907 B1 * | 6/2004 | Sukthankar et al. | 348/222.1 |
| 7,144,115 B2 * | 12/2006 | Li | 353/31 |
| 7,347,564 B2 | 3/2008 | Matsumoto et al. | |
| 7,637,619 B2 * | 12/2009 | Matsumoto et al. | 353/85 |
| 2002/0024640 A1 * | 2/2002 | Ioka | 353/94 |
| 2005/0024606 A1 * | 2/2005 | Li et al. | 353/121 |
| 2005/0286026 A1 * | 12/2005 | Matsumoto et al. | 353/101 |
| 2007/0002286 A1 * | 1/2007 | Matsumoto et al. | 353/85 |
| 2008/0158403 A1 * | 7/2008 | Itano et al. | 348/308 |
| 2009/0002510 A1 * | 1/2009 | Uchihashi et al. | 348/222.1 |
| 2009/0278959 A1 * | 11/2009 | Kato | 348/239 |
| 2010/0079653 A1 * | 4/2010 | Pance | 348/333.1 |
| 2011/0013042 A1 * | 1/2011 | Itano et al. | 348/222.1 |
| 2011/0234918 A1 * | 9/2011 | Hsieh et al. | 348/744 |

FOREIGN PATENT DOCUMENTS

| | | |
|---|---|---|
| JP | A-2006-060447 | 3/2006 |
| JP | A-2008-211355 | 9/2008 |

\* cited by examiner

*Primary Examiner* — Antoinette Spinks
(74) *Attorney, Agent, or Firm* — Oliff PLC

(57) ABSTRACT

A projection display device adapted to display a projection image based on external image data input externally, includes: a projection section; an image data storage section adapted to store projection image data; an image control section adapted to execute an image data obtaining process; an image capturing section adapted to capture a projection area including the projection surface to generate a captured image; and a correction amount determination section adapted to execute a correction amount determination process for determining a correction amount, wherein the image control section halts the image data obtaining process during a period in which the correction amount determination section is executing the correction amount determination process, and after the correction amount determination process is terminated, makes the projection section display a temporary projection image obtained by correcting an image data previously stored in the image data storage section, and resumes the image data obtaining process.

7 Claims, 8 Drawing Sheets

PROJECTION DISPLAY DEVICE AND METHOD OF CONTROLLING THE SAME

BACKGROUND

1. Technical Field

The present invention relates to a projection display device for projecting, and thereby displaying an image.

2. Related Art

From the past, in projection display devices such as projectors, there has been known a technology of capturing an image of a screen with a capturing device such as a CCD provided to the projection display device and detecting a screen frame from the captured image in order for correcting distortion of an image (hereinafter referred to as a "projection image") thus projected (JP-A-2006-60447). Further, JP-A-2008-211355 discloses an example of the related art.

Incidentally, a huge amount of calculation such as coordinate conversion is generally performed in a process for determining the correction amount used for correcting the distortion of the image described above. Therefore, in some cases, a time lag of, for example, several seconds is caused before the image, which the correction is reflected on, and the user desires, is displayed. Such a time lag causes the user to feel uncomfortable, and the usability of the projection display device to be degraded. However, in actual situations, sufficient devices have not ever been made with respect to such a problem.

SUMMARY

An advantage of some aspects of the invention is to provide a technology for reducing the time until the image requested by the user is displayed, and for enhancing the usability in the projection display device.

The invention can be realized as following embodiments and aspects.

According to a first aspect of the invention, there is provided a projection display device adapted to display a projection image based on external image data input externally, including a projection section adapted to project image light representing the projection image on a projection surface, an image data storage section adapted to store projection image data including the external image data, an image control section adapted to execute an image data obtaining process for obtaining the external image data and storing the external image data in the image data storage section, and making the projection section project the projection image, an image capturing section adapted to capture a projection area including the projection surface to generate a captured image, and a correction amount determination section adapted to execute a correction amount determination process for determining a correction amount for correcting the projection image using the captured image, and the image control section halts the image data obtaining process during a period in which the correction amount determination section is executing the correction amount determination process, and after the correction amount determination process is terminated, makes the projection section display a temporary projection image obtained by correcting an image data previously stored in the image data storage section, using the correction amount determined, and resumes the image data obtaining process.

According to the projection display device of this aspect, by temporarily halting the image data obtaining process, it is prevented that the image data obtaining process is executed in parallel with the correction amount determination process, and thus the processing speed of the correction amount determination process can be enhanced. Further, since the image previously prepared is displayed while reflecting the correction during the recovery time from when the correction amount is determined to when the normal projection and display become possible again, the uncomfortable feeling the user has until the projection display recovers can be reduced. In other words, the time period from when the correction process is started to when the image requested by the user is displayed can be reduced, thus the usability of the projection display device can be enhanced.

According to a second aspect of the invention, in the projection display device of the first aspect of the invention, the image data storage section includes an external image data storage section adapted to store the external image data, and a temporary projection image data storage section adapted to store temporary projection image data for generating the temporary projection image, and the image control section transfers, when halting the image data obtaining process, obtained image data, which is stored in the external image data storage section prior to halting the image data obtaining process, to the temporary projection image data storage section, and after the correction amount determination process is terminated, makes the projection section display the temporary projection image generated from the obtained image data stored in the temporary projection image data storage section, and resumes the image data obtaining process.

According to the projection display device of this aspect of the invention, the image having been obtained before the correction process is started is corrected and displayed in the recovery time from when the correction amount is determined to when the normal projection display becomes possible again. Therefore, since the transition from the temporary projection image to the projection display of the external image data is performed in a seamless manner, the uncomfortable feeling of the user can be reduced, and the usability of the projection display device can be enhanced.

According to a third aspect of the invention, in the projection display device of one of the first and second aspects of the invention, the temporary projection image is kept displayed until the projection image based on the external image data obtained by the image data obtaining process resumed is displayed.

According to the projection display device of this aspect of the invention, the image having been obtained before the correction process is started is continuously displayed as the temporary projection image during the recovery time from when the correction amount is determined to when the normal projection display becomes possible again. Therefore, the uncomfortable feeling of the user can be reduced, and the usability of the projection display device can be enhanced.

According to a fourth aspect of the invention, there is provided a projection display device adapted to display a projection image based on external image data input externally, including a projection section adapted to project image light representing the projection image on a projection surface, an image data storage section adapted to store projection image data including the external image data, an image control section adapted to execute an image data obtaining process for obtaining the external image data and storing the external image data in the image data storage section, and making the projection section project the projection image, an image capturing section adapted to capture a projection area including the projection surface to generate a captured image, and a correction amount determination section adapted to execute a correction amount determination process for determining a correction amount for correcting the projection image using the captured image, and the image control section previously stores image data into the image data storage section before the correction amount determination section starts the correction amount determination process, and makes the projection section display a temporary projection image, which is obtained by correcting the image data previously stored in the image data storage section using the correction amount determined, after the correction amount determination process is terminated.

According to a fifth aspect of the invention, there is provided a method of controlling a projection display device adapted to display a projection image based on external image data input externally, the method including (a) executing an image data obtaining process for obtaining the external image data and storing the external image data into an image data storage section, (b) determining a correction amount for correcting a display state of the projection image using a captured image generated by capturing a projection area including a projection surface by an image capturing section while temporarily halting the image data obtaining process, and (c) making the projection section display a temporary projection image obtained by correcting image data stored in the image data storage section using the correction amount, and resuming the image data obtaining process, after the correction amount is determined.

It should be noted that the invention can be realized in various forms, such as a projection display device and a method of controlling the projection display device, a computer program for realizing the function of the device or the control method thereof, or a recording medium storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will hereinafter be explained based on a specific example in the following order.
A. Embodiment
B. Modified Examples

A. Embodiment

Figure 1:
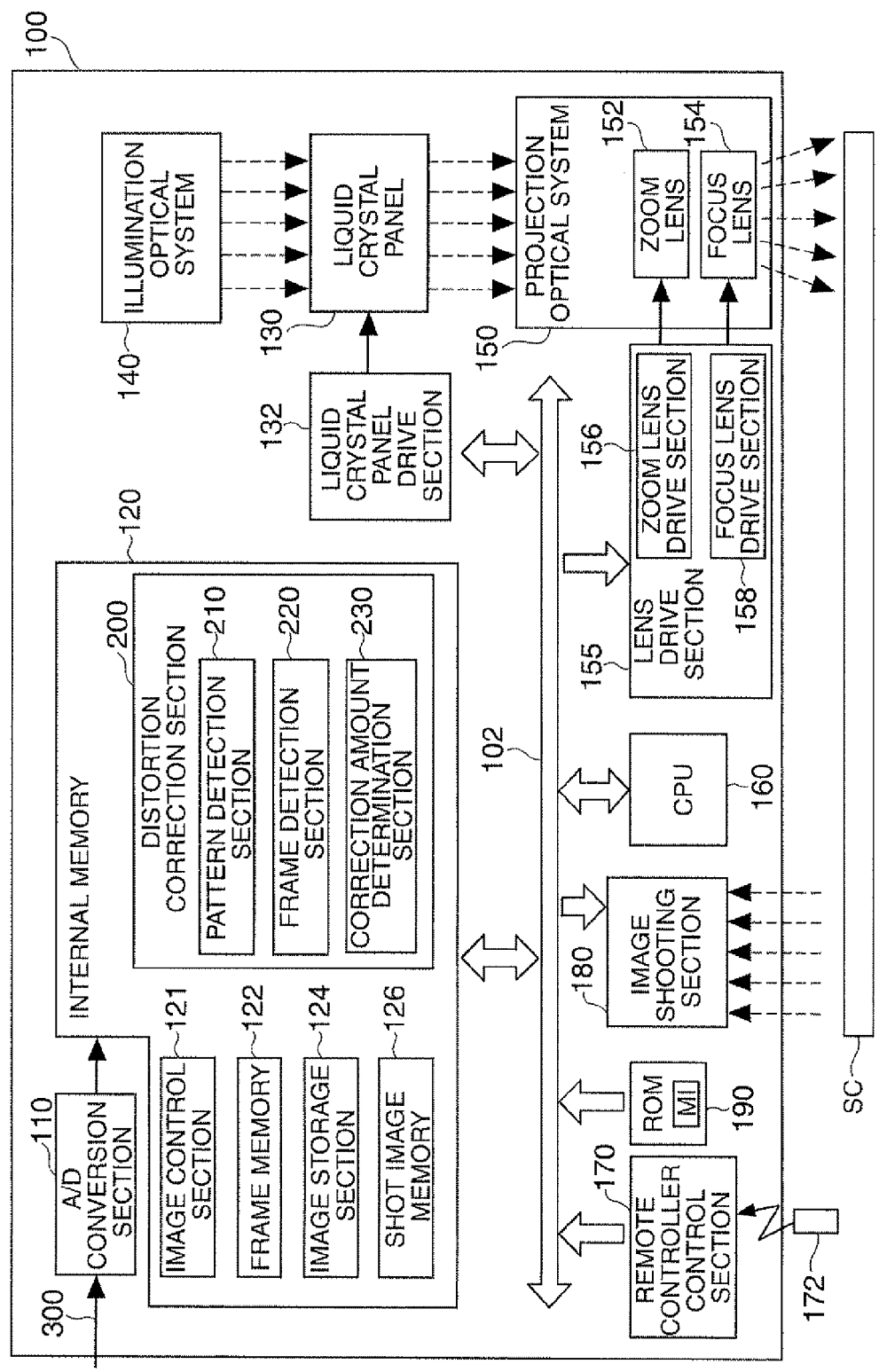
FIG. 1 is a block diagram showing an internal configuration of a projector.

FIG. 1 is a block diagram schematically showing a configuration of a projector as an embodiment of the invention.

The projector 100 projects image light representing an image, thereby displaying the image (hereinafter referred to as a "display image") on a projection surface such as a screen SC. In the present embodiment, it is assumed that the screen SC has a rectangular shape with a black frame along the outer circumference thereof.

The projector 100 is provided with an internal memory 120, a liquid crystal panel 130, a liquid crystal panel drive section 132, a lens drive section 155, a CPU 160, a remote controller control section 170, an image capturing section 180, and a ROM 190. These constituents are connected to each other via an internal bus 102, and thus, the CPU 160 performs overall control of the projector 100. It should be noted that the ROM 190 stores image data of a measuring image MI used in a keystone correction process described later.

The projector 100 is further provided with an illumination optical system 140, and a projection optical system 150. It should be noted that the projection optical system 150 has a zoom lens 152 and a focus lens 154, and the lens drive section 155 has a zoom lens drive section 156 and a focus lens drive section 158 for respectively driving the zoom lens 152 and the focus lens 154.

Further, the projector 100 is provided with an A/D conversion section 110. The A/D conversion section 110 performs A/D conversion on an input image signal input from an external image source such as a DVD player or a personal computer (PC) via a cable 300, and then outputs and transfers a digital image signal to the internal memory 120. It should be noted that the A/D conversion section 110 is connected to the CPU 160 via a bus not shown, and the CPU 160 performs a monitoring process of a sync signal for sampling the received signal.

The internal memory 120 is provided with a frame memory 122, an image storage section 124, and a captured image memory 126 as storage areas for image data. Further, the internal memory 120 stores an image control section 121 and a distortion correction section 200, as computer programs. The distortion correction section 200 has a pattern detection section 210, a frame detection section 220, and a correction amount determination section 230, as modules thereof. The CPU 160 retrieves and then executes each of the programs 121, 200, the functions of which will be described later.

The liquid crystal panel drive section 132 drives the liquid crystal panel 130 based on the image data input via the image control section 121. The liquid crystal panel 130 forms an image (hereinafter referred to as a "valid panel image PI") for modulating the illumination light emitted from the illumination optical system 140 into valid image light representing the image in an image forming area IF on a surface (hereinafter referred to as a "panel surface") of the liquid crystal panel 130.

Figure 2A:
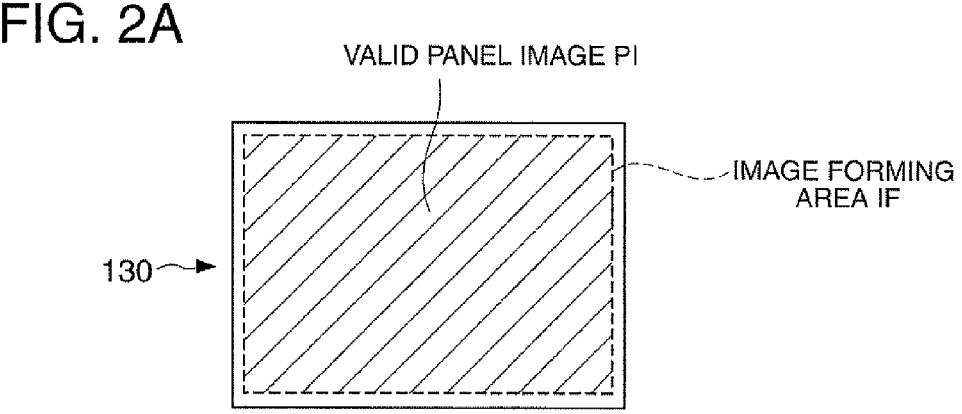
FIGS. 2A through 2C are schematic diagrams for explaining an image forming area of a liquid crystal panel.
Figure 2B:
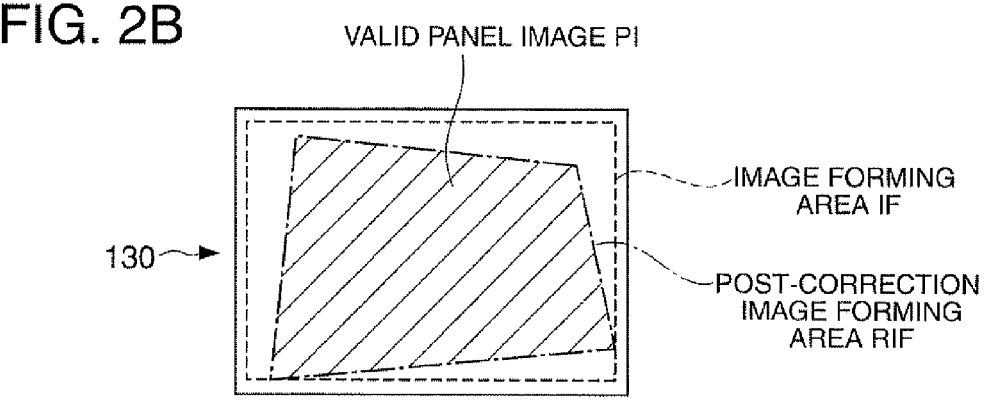
Figure 2C:
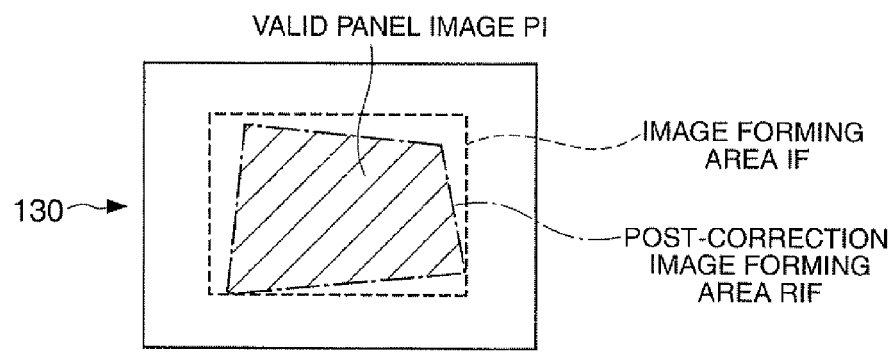

FIGS. 2A through 2C are explanatory diagrams schematically showing a relationship between the liquid crystal panel 130 and the image forming area IF. The image forming area IF denotes an area on the panel surface of the liquid crystal panel 130 in which the valid panel image PI can be formed based on the digital image signal input to the liquid crystal panel drive section 132. FIGS. 2A through 2C show the image forming area IF as an area surrounded by broken lines. As shown in FIG. 2A, the image forming area IF of the present embodiment is set to be an area with four sides each roughly two dots smaller than that of the entire panel surface of the liquid crystal panel 130. It should be noted that the size of the image forming area IF with respect to the entire panel surface of the liquid crystal panel 130 can arbitrarily be set.

FIGS. 2A through 2C show the area with hatching, where the valid panel image PI is formed. The valid panel image PI is usually formed in the entire area of the image forming area IF as shown in FIG. 2A. However, in the case of executing the keystone correction process described later in detail, the valid panel image PI might be formed in a partial area of the image forming area IF of the liquid crystal panel 130, and an all-black image (represented by white areas in FIG. 2B) might be formed in the remaining area of the image forming area IF as shown in FIG. 2B. The partial area of the image forming area IF where the valid panel image PI is formed when executing the keystone correction is referred to as a "post-correction image forming area RIF." FIGS. 2A through 2C show the post-correction image forming area RIF as an area surrounded by dashed lines.

Here, there is assumed a case, for example, in which the resolution of the digital image signal input to the liquid crystal panel drive section 132 is lower than the resolution of the liquid crystal panel 130, and the digital image thus input is directly formed on the liquid crystal panel 130 without magnification. In this case, as shown in FIG. 2C, the image forming area IF is consequently set in an area much smaller than the entire panel surface of the liquid crystal panel 130 in accordance with the ratio of the both resolutions.

The light emitted from the illumination optical system 140 (FIG. 1) and applied on the panel surface of the liquid crystal panel 130 is modulated by the liquid crystal panel 130 into the image light. The projection optical system 150 is attached to a front surface of a housing of the projector 100, and enlargedly projects the image light obtained by modulating the light. More specifically, the lens drive section 155 drives the zoom lens 152 and the focus lens 154 of the projection optical system 150 with the zoom lens drive section 156 and the focus lens drive section 158, thereby adjusting the zoom state and the focus state of the display image. Here, the zoom state denotes the level (magnifying power) of the magnification when projecting the light transmitted through the liquid crystal panel 130 in the projection optical system 150, and can be controlled by varying the focal length of the projection optical system 150. Further, the focus state denotes the degree of focusing of the display image, and can be controlled by moving the focus lens 154 along the optical axis to vary the position of the focus.

The remote controller control section 170 receives instructions from the user via a remote controller 172, and transmits the instructions to the CPU 160 via the internal bus 102. It should be noted that although it is assumed in the present embodiment that the projector 100 receives the instructions from the user via the remote controller 172 and the remote controller control section 170, it is also possible to receive the instructions from the user via other configurations such as an operation panel.

The image capturing section 180 has a CCD camera, and generates a captured image by capturing. The installation position and the field angle of the image capturing section 180 are set so that the image capturing section 180 can capture the entire area where the image corresponding to the maximum image forming area IF (see FIG. 2A) of the liquid crystal panel 130 is projected. The captured image generated by the image capturing section 180 is stored in the captured image memory 126, and is used in the keystone correction process described later. It should be noted that the image capturing section 180 can also be arranged to have other capturing devices instead of the CCD camera.

Figure 3A:
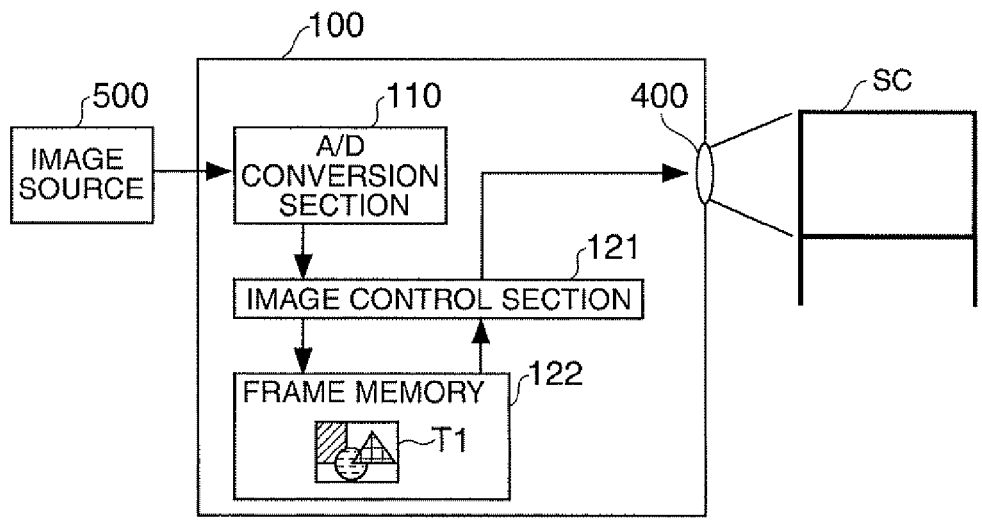
FIGS. 3A through 3C are schematic diagrams for explaining the projector in which a projection display process is in progress.
Figure 3B:
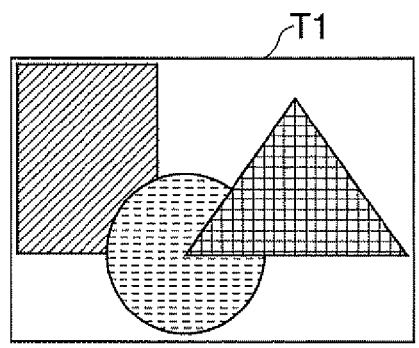
Figure 3C:
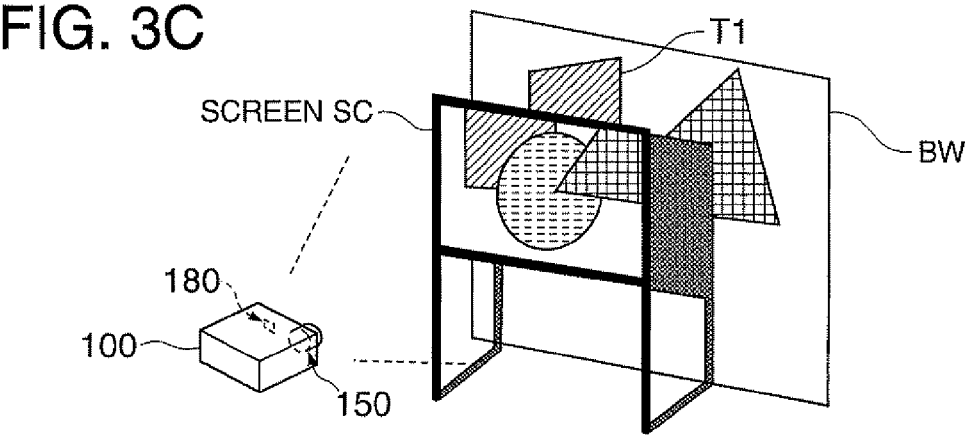

FIGS. 3A through 3C are explanatory diagrams for more specifically explaining the projection display process of the image by the projector 100. FIG. 3A is a functional block diagram showing a cooperative actions of the functions of the respective constituents in the projector 100, and shows the state thereof immediately after starting projection on the screen SC based on image data of an image T1 obtained from an external image source 500. It should be noted that in FIG. 3A, the internal constituents of the projector 100 not related to the explanations are omitted from the illustration, and the A/D conversion section 110, the frame memory 122, and the image control section 121 explained in FIG. 1 are illustrated as the internal constituents of the projector 100. Further, FIG. 3A illustrates the liquid crystal panel 130, the liquid crystal panel drive section 132, the illumination optical system 140, the projection optical system 150, and the lens drive section 155 explained in FIG. 1 by transcribing them as an image light modulation and projection section 400 for the sake of convenience of explanation. In other words, the image light modulation and projection section 400 has a function of generating and then projecting the image light based on the image data received from the image control section 121.

FIG. 3B is a diagram schematically showing the image T1 as an example of the image represented by the image data transmitted from the image source 500. It should be noted that the content of the image T1 is not particularly limited, but can be an ornamental image to be an object of appreciation such as an arbitrary image displayed by the user using the projector 100 or a trademark displayed upon powering on the projector 100. Further, the content of the image T1 can be an image projected for a specific purpose such as detection of the three-dimensional coordinate of the screen SC, and there is no limitation on presence or absence of a pattern.

The image control section 121 stores the image data generated from the digital image signal output from the A/D conversion section 110 into the frame memory 122. FIG. 3A shows the state in which the image data of the image T1 is stored in the frame memory 122. Further, the image control section 121 performs the adjustment of the display state (e.g., brightness, contrast, synchronization, tracking, depth of colors, and coloring) of the image on the image data of the frame memory 122, and then outputs the image data to the image light modulation and projection section 400. The image light modulation and projection section 400 projects the image light modulated in accordance with the image data on the screen SC.

FIG. 3C schematically shows the state in which the projector 100 projects and thereby displaying the image T1. In this drawing, the image T1 is displayed in the distorted state, and the image light of the image T1 is consequently projected so as to overlap the screen SC or a back wall surface BW behind the screen SC. As described above, immediately after starting the projection display of the image, there might be some cases in which the projection image is not appropriately displayed with, for example, distorted projection image or running off the screen SC due to the arrangement state of the projector 100, the zoom ratio of the projection optical system 150, the focal length, and so on. Therefore, in the projector 100 of the present embodiment, the display state of the image can appropriately be adjusted by executing the keystone correction process.

Figure 4:
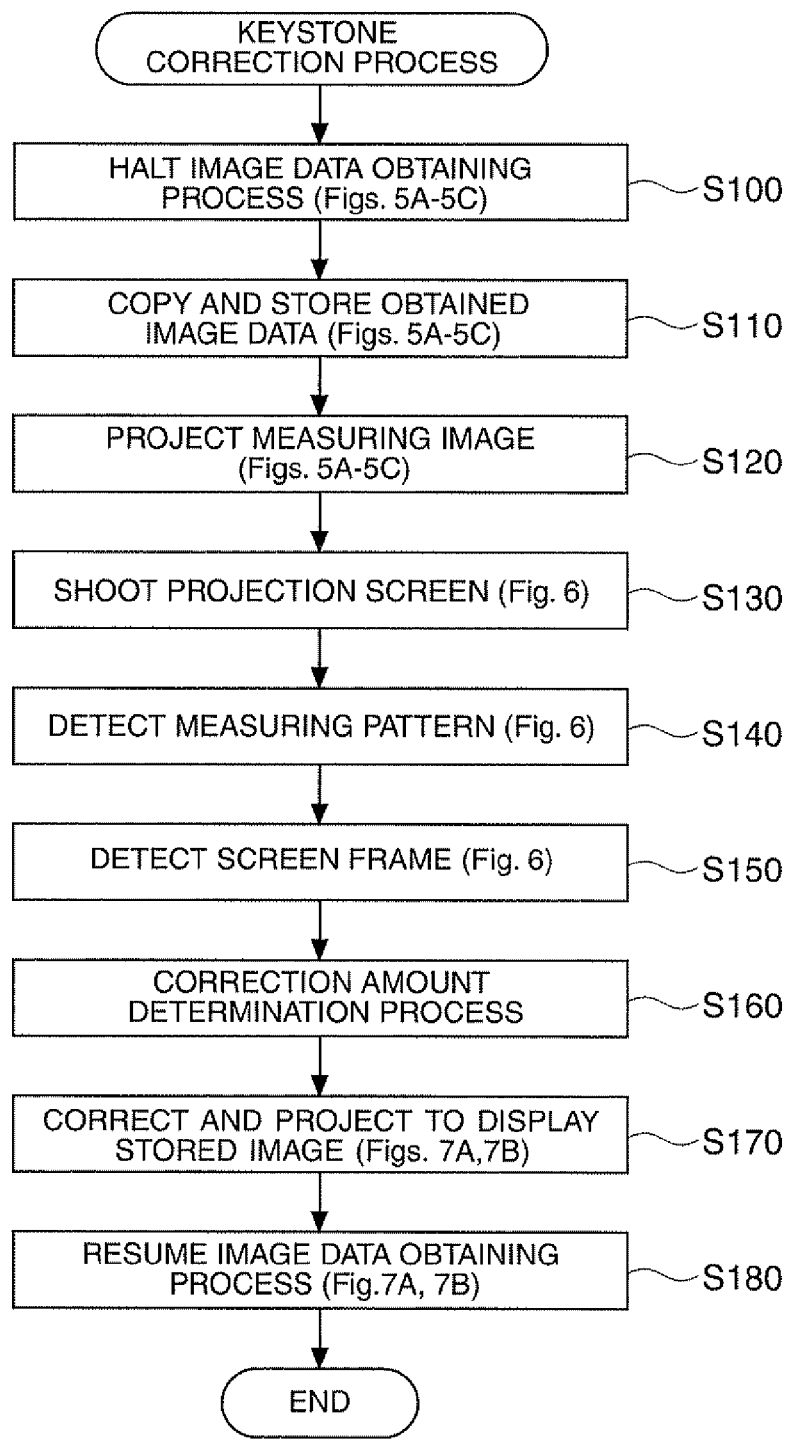
FIG. 4 is a flowchart showing a processing procedure of a keystone correction process.

FIG. 4 is a flowchart showing a processing procedure of the keystone correction process executed by the projector 100. The keystone correction process is a process for correcting the keystone distortion of the display image so that the sides of the outer circumferential lines of the display image on the screen SC become parallel to the respective sides of the frame of the screen SC. It is possible to arrange that the keystone correction process is performed in accordance with the instruction from the user via the remote controller 172, or that the keystone correction process is automatically performed when stating up the projector 100 or in response to the commencement of input of the image signal.

Figure 5A:
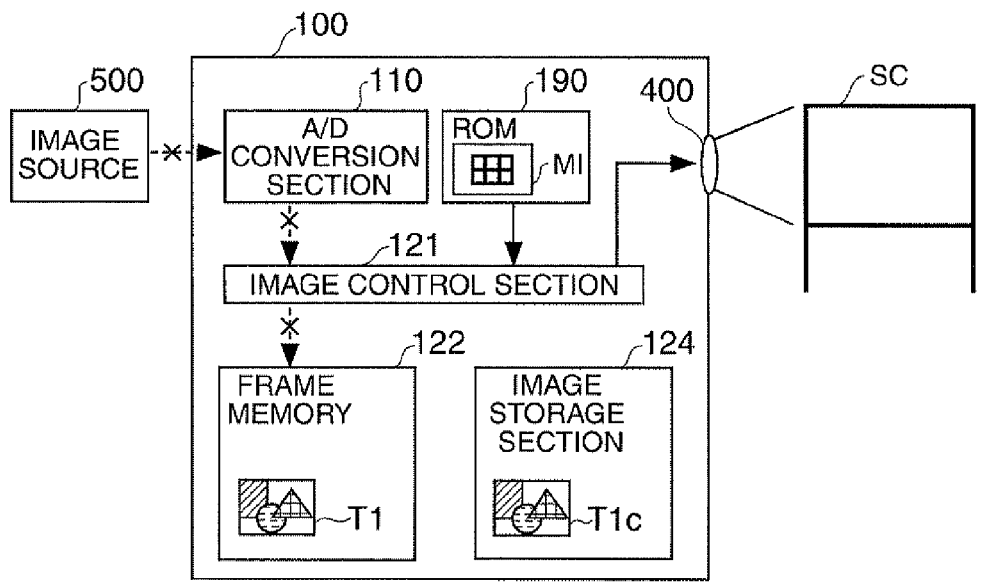
FIGS. 5A through 5C are schematic diagrams for explaining the projector in which a projection display process of a measuring image is in progress.

FIG. 5A is a functional block diagram similarly to FIG. 3A showing the cooperative actions of the functions to the respective constituents of the projector 100 in the process of the steps S100 through S120. FIG. 5A shows the ROM 190 and the image storage section 124 in addition to the constituents shown in FIG. 3A.

In the step S100, the image control section 121 stops the process of obtaining the image data from the external image source 500. Specifically, the image control section 121 stops the process of monitoring the sync signal for sampling the input image signal in the A/D conversion section 110 conducted by the CPU 160. Further, the image control section 121 stops the process of storing the image data, which is input from the external image source 500, into the frame memory 122, the correction process for adjusting the display state of the image with respect to the image data stored in the frame memory 122, and so on. It should be noted that in FIG. 5A, the stoppage of the cooperative action between the constituents, such as data transmission therebetween, is illustrated with the broken arrow line and the symbol "x." By previously stopping the processes executed in the CPU 160 as described above, it becomes possible to increase the CPU time used by the correction amount determination process described later, thereby increasing the processing speed.

In the step S110, the image control section 121 stores the copied image data of the image T1, which is stored in the frame memory 122, in the image storage section 124. In other words, the image data of the image T1 is transferred to the image storage section 124. It should be noted that hereinafter the image stored into the image storage section 124 in the step S110 is referred to as an "image T1c" for distinguishing the image from the image T1. In the step S120, the image control section 121 retrieves the measuring image data MI stored in the ROM 190, and then makes the image light modulation and projection section 400 project the measuring image MI.

Figure 5B:
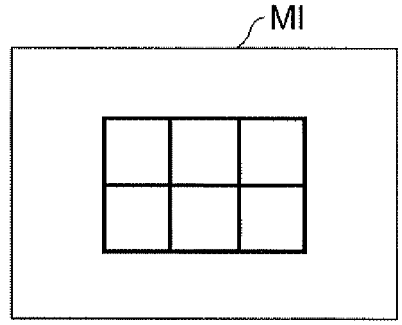
Figure 5C:
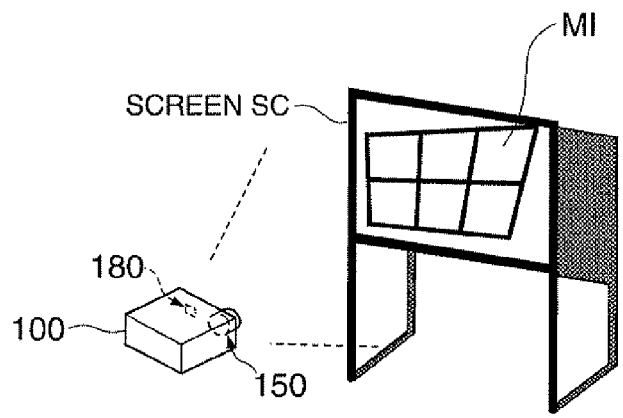

FIG. 5B is a schematic diagram showing an example of the measuring image MI. In the measuring image MI shown in FIG. 5B, there is illustrated a figure having a lattice shape composed of three straight lines extending in a horizontal direction and four straight lines extending in a vertical direction intersecting with each other. It should be noted that the measuring image MI can be arranged to have other figures, characters, patterns, and so on, and the display color and the display size thereof are not particularly limited. Any image in which the coordinate of the predetermined measurement point to be used in the correction amount determination process described later can be detected can sufficiently be used as the measuring image MI. FIG. 5C is a schematic diagram showing the state in which the projector 100 projects the measuring image MI on the screen SC. The measuring image MI is displayed on the screen SC in the distorted state.

In the step S130, the image control section 121 makes the image capturing section 180 (FIG. 1) capture the screen SC and the measuring image MI projected on the screen SC, thereby generating the image data of the captured image CI. It should be noted that the setting position and the field angle of the image capturing section 180 is previously set so as to be able to capture the area including the screen SC and the projection image. The image control section 121 stores the image data of the captured image CI into the captured image memory 126.

Figure 6:
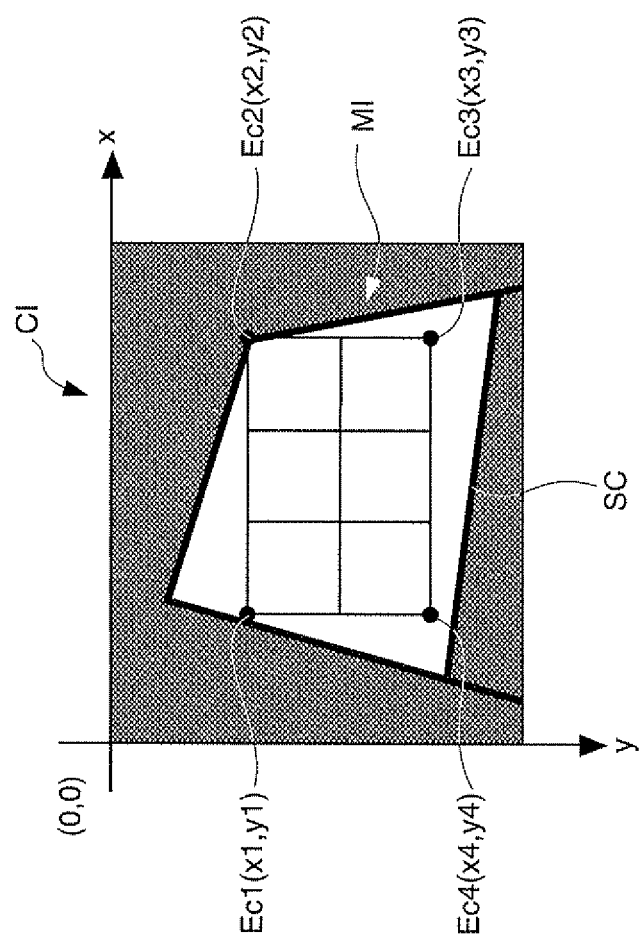
FIG. 6 is a schematic diagram for explaining a captured image generated by an image capturing section.

FIG. 6 is a schematic diagram showing an example of the captured image CI. It should be noted that in FIG. 6 the measurement points Ec1 through Ec4 detected in the process described later are illustrated with filled circles. In the captured image CI, the image of the screen SC is shown in a distorted manner in accordance with the tilt angle of the projection surface of the screen SC with respect to the optical axis of the image capturing section 180. Further, although the image of the measuring image MI projected on the screen SC is shown in the drawing in the state without distortion, in a precise sense, it is shown in the captured image CI in the state with distortion corresponding to the shift of the positions of the optical axis of the projection optical system 150 and the optical axis of the image capturing section 180.

In the step S140 (FIG. 4), the pattern detection section 210 (FIG. 1) of the distortion correction section 200 retrieves the image data of the captured image CI stored in the captured image memory 126. The pattern detection section 210 detects the coordinates of the four measurement points Ec1 through Ec4 out of the measuring image MI shown in the captured image CI. Each of the measurement points is specified by, for example, detecting feature points such as a contour of the measuring image MI out of the captured image CI. Here, it is assumed that the four measurement points Ec1 through Ec4 in the present embodiment are points forming four corners existing on the outer frame of the lattice-shaped figure included in the measuring image MI, respectively. The pattern detection section 210 specifies the coordinates of the respective measurement points in the coordinate system (hereinafter also referred to as a "camera coordinate system") on a plane perpendicular to the optical axis of the lens of the CCD camera. More specifically, taking the upper left corner of the captured image CI as the origin (0, 0), and taking the x-axis and the y-axis in the horizontal direction and the vertical direction, respectively, the coordinates Ec1 (x1, y1), Ec2 (x2, y2), Ec3 (x3, y3), and Ec4 (x4, y4) of the respective measurement points Ec1, Ec2, Ec3, and Ec4 are detected. In other words, the four coordinates Ec1 (x1, y1), Ec2 (x2, y2), Ec3 (x3, y3), and Ec4 (x4, y4) are coordinates of the respective measurement points in the captured image CI. It should be noted that the position of the origin is not limited to the upper left corner of the captured image CI, but it is possible to use a point on the optical axis of the camera as the origin.

Further, in the step S150 (FIG. 4), the frame detection section 220 (FIG. 1) of the distortion correction section 200 detects the frame sides of the screen SC out of the captured image CI. Specifically, the frame detection section 220 applies a contour definition filter such as a differential filter or a Laplacian filter to the captured image CI to detect edges caused by the screen frame, and then specifies the positions of the frame sides of the screen SC from the edges. It should be noted that it is preferable to use the contour definition filter reacting strongly to the contour in the lateral direction (the horizontal direction) of the captured image CI when performing the edge detection with respect to the left side and the right side of the screen frame, and it is preferable to use the contour detection filter reacting strongly to the contour in the up-and-down direction (the vertical direction) of the captured image CI when performing the detection with respect to the upper side and the lower side of the screen frame. The method of specifying the position of the screen frame is not particularly limited, and it is possible to specify the position by, for example, detecting the coordinate values of the four vertexes of the frame of the screen SC in the camera coordinate system.

In the step S160 (FIG. 4), the correction amount determination section 230 (FIG. 1) determines an amount of the correction when performing the keystone correction with reference to the coordinates of the measurement points Ec1 through Ec4 detected in the step S140 and the position of the frame sides of the screen SC detected in the step S150. The keystone correction can be performed using a known method (e.g., the method described in JP-A-2006-60447 described above). Specifically, the coordinate values of the frame sides of the screen SC, thus detected, in the camera coordinate system are converted into those in a standard coordinate system of a lens coordinate system taking the primary point of the projection optical system 150 as the origin using the projective transformation. The projective transformation is performed for compensating the difference between the optical axis of the projection optical system 150 and the optical axis of the lens of the image capturing section 180 in the projector 100. According to the projective transformation, the coordinates of the screen frame in the lens coordinate system can be obtained, and the area on the liquid crystal panel 130 corresponding to the screen SC can be determined as the post-correction image forming area RIF (FIG. 2C) based on the coordinate values. Further, the correction amount determination section 230 determines the adjustment amount of the zoom ratio based on the position of the frame sides of the screen SC so that the projection image is displayed on the screen SC with an appropriate display magnification.

Figure 7A:
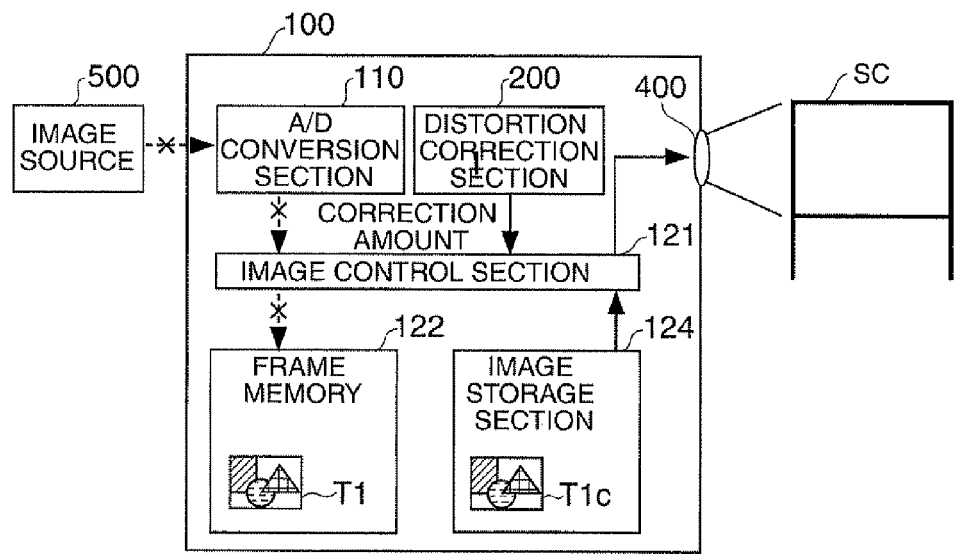
FIGS. 7A and 7B are schematic diagrams for explaining a projector for temporarily projecting and thereby displaying an image stored in an image storage section.

FIG. 7A is a functional block diagram showing the cooperative actions of the functions of the respective constituents of the projector 100 in the process of the step S170. FIG. 7A is substantially the same as FIG. 5A except the point that the distortion correction section 200 is shown instead of the ROM 190 and the point that the illustration of the arrows between the constituents is different. In the step S170, the image control section 121 retrieves the image data of the image T1c stored in the image storage section 124, and makes the image light modulation and projection section 400 project the image T1c after reflecting the keystone correction amount and the adjustment amount of the zoom ratio, which are determined by the correction amount determination section 230, on the image data thereof. In other words, in the present process, the image T1c is projected without obtaining the image data from the image source 500. FIG. 7S schematically shows the state in which the projector 100 projects and thereby displaying the image T1c. As shown in the drawing, the image T1c having the distortion eliminated therefrom and adjusted to have the appropriate zoom state and focus state is displayed on the screen SC. Subsequently, in the step S180, the image control section 121 resumes the process of obtaining the image data from the image source 500 halted in the step S100.

Figure 8A:
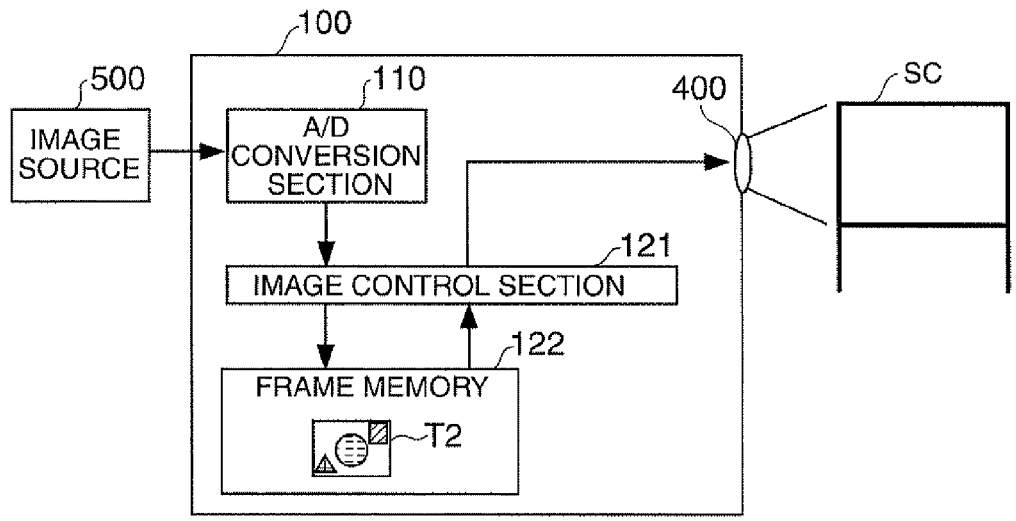
FIGS. 8A through 8C are schematic diagrams for explaining the projector in which a projection display process is resumed.
Figure 8B:
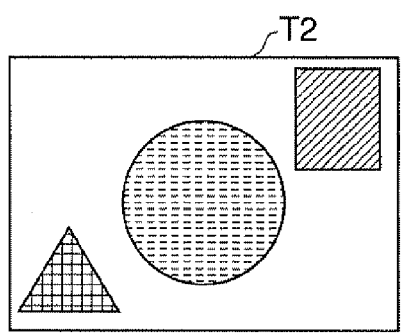
Figure 8C:
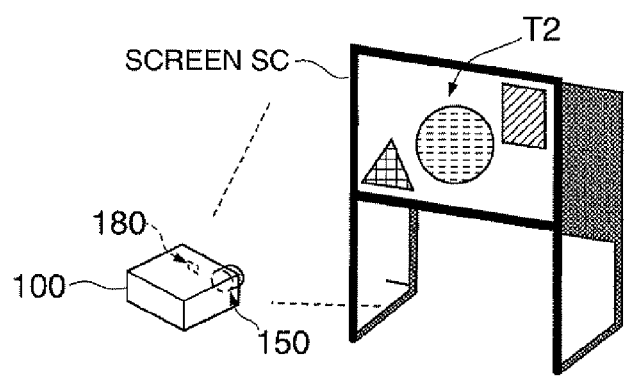

FIGS. 8A through 8C are explanatory diagrams for explaining the projector 100 in which the normal projection process has been resumed after executing the keystone correction process. FIGS. 8A through 8C are substantially the same as FIGS. 3A through 3C, respectively, except the point that an image T2 newly obtained from the image source 500 is displayed instead of the image T1, and the point that the display state of the image T2 on the screen SC is corrected similarly to that of the image T1c shown in FIG. 7S. As described above, after the image control section 121 resumes the image data obtaining process in the step S180, the projector 100 performs the normal projection display process for sequentially projecting and thereby displaying the image data transmitted from the image source 500 the screen SC while reflecting the correction thereon.

Incidentally, in general, when resuming the process of the CPU having been halted once, it takes some time until the processes and cooperative actions of the respective constituents such as hardware controlled by the CPU recover completely. Therefore, also in the projector 100 it takes, for example, several seconds after the image data obtaining process is resumed in the step S180 (FIG. 4) until the image from the image source 500 is displayed as shown in FIG. 8B.

Here, as a comparative example to the present embodiment, there is assumed the case in which the step S170 is not executed in the keystone correction process (FIG. 4), and an all-black image or an all-white image is displayed on the screen SC subsequently to the step S160. In this case, in the period from when the image data obtaining process is resumed in the step S180 to when the image requested by the user is displayed, the all-black image or the all-white image displayed subsequently to the step S160 is kept displayed. In other words, the state in which the image requested by the user is not displayed consequently continues for several seconds, resulting in providing the user with uncomfortable feeling.

However, in the projector 100, the image data of the image T1c previously copied is displayed in the step S170 in the state in which the correction is reflected thereon (FIGS. 7A and 7S). In other words, the image having been displayed on the screen SC before starting the keystone correction process is consequently displayed immediately after determining the correction amount in the state of reflecting the correction. Therefore, since the image required by the user is displayed at earlier timing, the uncomfortable feeling of the user is reduced. Further, since the result of the correction can be checked earlier, the usability of the projector 100 is enhanced. Further, in the projector 100, the image T1c thus corrected is displayed during the time lag corresponding to the recovery time of the image data obtaining process of the projector described above, and then the image transmitted from the image source 500 is displayed with the correction subsequently to the image T1c in a seamless manner. Therefore, the uncomfortable feeling the user has before resuming the display by the projector 100 can further be reduced.

As described above, according to the projector 100 of the present embodiment, since the process of obtaining the image data from the image source 500 executed by the CPU 160 is halted once after starting the keystone correction process, the processing speed of the keystone correction process is thereafter increased. Therefore, the time period in which the image requested by the user is not displayed due to the keystone correction process can be reduced. Further, since the projector 100 corrects the image previously stored in the image storage section 124 and then immediately displays the image thus corrected after determining the correction amount, the uncomfortable feeling the user has before the projection process of the normal image is resumed can be reduced. In other words, the usability of the projector 100 can be enhanced.

B. Modified Examples

It should be noted that the invention is not limited to the specific examples and the embodiment described above, but can be put into practice in various forms within the scope or the spirit of the invention, and the following modifications, for example, are also possible.

B1. First Modified Example

In the embodiment described above, it is possible to replace a part of the configuration realized by hardware with software, or to replace a part of the configuration realized by software with hardware. For example, although in the embodiment described above the image processing such as the keystone correction process is executed by the CPU 160 retrieving the computer program from the internal memory 120, it is also possible to arrange that the process is executed by an application specific integrated circuit (ASIC).

B2. Second Modified Example

Figure 7B:
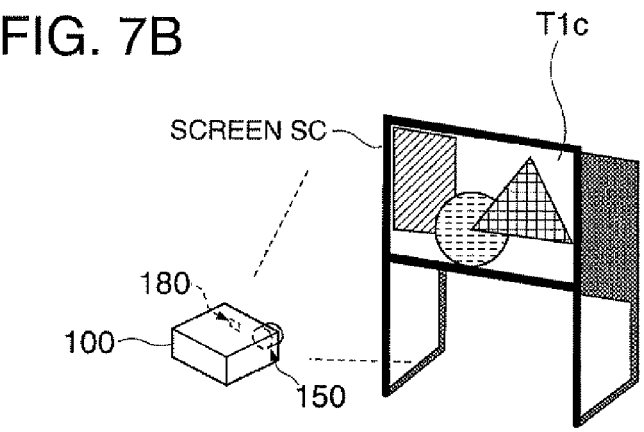

In the embodiment described above, the projector 100 corrects and then displays the copied image T1c of the image T1, which is displayed by projection before starting execution of the keystone correction process, after determining the correction amount (step S170, FIGS. 7A and 7B). However, it also possible to arrange that the projector 100 displays a different image in the step S170. For example, it is also possible to arrange that the display informing the user of the time taken until the projection display is resumed. Further, it is also possible to arrange that the pattern image (e.g., a lattice-shaped pattern image) enhancing the visibility of the correction result by the keystone correction process is displayed. Further, it is also possible to arrange that a moving image or a wallpaper previously stored in the ROM 190 is displayed.

B3. Third Modified Example

In the embodiment described above, the image T1c displayed in the step S170 is kept displayed until the normal projection display process is resumed and the display of the image from the image source 500 becomes possible. However, it is also possible to arrange that the temporary image displayed in the step S170 is continuously displayed after the projector becomes in the state in which the image from the image source 500 can be displayed. In this case, it is also possible to arrange that the process is switched to the normal projection display process using the instruction of the user via the remote controller 172 as a trigger.

Further, in the embodiment described above, the image T1c temporarily projected to be displayed in the step S170 is kept displayed until the image from the image source 500 is displayed. However, it is also possible to arrange that the display of the image T1c temporarily projected to be displayed is terminated before the display of the image from the image source 500 is started. For example, it is also possible to arrange that a different image is displayed subsequently to the image T1c, and then the display of the image from the image source 500 is started.

B4. Fourth Modified Example

In the embodiment described above, the image control section 121 transfers the image data of the image T1, which has been displayed before starting the keystone correction process, to the image storage section 124. However, it is also possible to arrange that the image storage section 124 is eliminated, and it is also possible to arrange that the process of the step S170 is executed using, for example, the image data of the image T1 stored in the frame memory 122.

B5. Fifth Modified Example

In the embodiment described above, as the processes for correcting the display state of the projection image, the keystone correction process and the correction process for adjusting the zoom state and the focus state are executed. However, it is also possible to arrange that other correction processes are executed instead of these correction processes. For example, it is also possible to arrange that a filter process for applying a certain effect requested by the user is executed. Further, in the embodiment described above, it is also possible to arrange that the correction process for adjusting the zoom state and the focus state and the keystone correction process are executed using other methods. For example, it is also possible to arrange that the keystone correction process is executed by measuring the tilt angle of the projection surface of the screen SC using triangulation by the stereo camera method without detecting the outer frame of the screen SC. Further, in a similar manner, it is also possible to arrange that the distance from the screen SC is measured using the triangulation by the stereo camera method, thereby adjusting the zoom state and the focus state. It should be noted that it is possible to arrange that the adjustment of the zoom state and the focus state is eliminated.

The entire disclosure of Japanese Patent Application NO. 2009-009721, filed Jan. 20, 2009 is expressly incorporated by reference herein.

What is claimed is:

1. A projection display device adapted to display a projection image based on external image data input externally, comprising:
   a projection section adapted to project image light representing the projection image on a projection surface;
   an image data storage section adapted to store projection image data including the external image data;
   an image control section adapted to execute an image data obtaining process for obtaining the external image data and storing the external image data in the image data storage section, and making the projection section project the projection image;
   an image capturing section adapted to capture a projection area including the projection surface and a measuring image projected on the projection surface to generate a captured image; and
   a correction amount determination section adapted to execute a correction amount determination process for determining a correction amount for correcting the projection image using the captured image,
   wherein the image control section halts the image data obtaining process during a period in which the correction amount determination section is executing the correction amount determination process, and after the correction amount determination process is terminated, makes the projection section display a temporary projection image obtained by correcting an image data previously stored in the image data storage section, using the correction amount determined, and resumes the image data obtaining process.

2. The projection display device according to claim 1, wherein
   the image data storage section includes
      an external image data storage section adapted to store the external image data, and
      a temporary projection image data storage section adapted to store temporary projection image data for generating the temporary projection image, and
   the image control section transfers, when halting the image data obtaining process, obtained image data, which is stored in the external image data storage section prior to halting the image data obtaining process, to the temporary projection image data storage section, and after the correction amount determination process is terminated, makes the projection section display the temporary projection image generated from the obtained image data stored in the temporary projection image data storage section, and resumes the image data obtaining process.

3. The projection display device according to claim 1, wherein
   the temporary projection image is kept displayed until the projection image based on the external image data obtained by the image data obtaining process resumed is displayed.

4. A projection display device adapted to display a projection image based on external image data input externally, comprising:
  a projection section adapted to project image light representing the projection image on a projection surface;
  an image data storage section adapted to store projection image data including the external image data;
  an image control section adapted to execute an image data obtaining process for obtaining the external image data and storing the external image data in the image data storage section, and making the projection section project the projection image;
  an image capturing section adapted to capture a projection area including the projection surface and a measuring image projected on the projection surface to generate a captured image; and
  a correction amount determination section adapted to execute a correction amount determination process for determining a correction amount for correcting the projection image using the captured image,
  wherein the image control section previously stores image data into the image data storage section before the correction amount determination section starts the correction amount determination process, and makes the projection section display a temporary projection image, which is obtained by correcting the image data previously stored in the image data storage section using the correction amount determined, after the correction amount determination process is terminated.

5. A method of controlling a projection display device adapted to display a projection image based on external image data input externally, the method comprising:
  (a) executing an image data obtaining process for obtaining the external image data and storing the external image data into an image data storage section;
  (b) determining a correction amount for correcting the projection image using a captured image generated by capturing a projection area including a projection surface and a measuring image projected on the projection surface by an image capturing section while temporarily halting the image data obtaining process; and
  (c) making the projection section display a temporary projection image obtained by correcting image data stored in the image data storage section using the correction amount, and resuming the image data obtaining process, after the correction amount is determined.

6. The projection display device according to claim 1, wherein the temporary projection image is not an all-black image.

7. The projection display device according to claim 1, wherein the temporary projection image is the image having been displayed on the screen before starting the correction amount determination process.

* * * * *